(12) United States Patent
Han et al.

(10) Patent No.: US 12,418,854 B2
(45) Date of Patent: Sep. 16, 2025

(54) METHOD AND APPARATUS FOR REPORTING USER PLANE FUNCTION INFORMATION, STORAGE MEDIUM, AND ELECTRONIC APPARATUS

(71) Applicant: ZTE Corporation, Shenzhen (CN)

(72) Inventors: Jiren Han, Shenzhen (CN); Yin Gao, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 797 days.

(21) Appl. No.: 17/635,439

(22) PCT Filed: Apr. 20, 2020

(86) PCT No.: PCT/CN2020/085661
§ 371 (c)(1),
(2) Date: Feb. 15, 2022

(87) PCT Pub. No.: WO2021/031592
PCT Pub. Date: Feb. 25, 2021

(65) Prior Publication Data
US 2022/0312309 A1 Sep. 29, 2022

(30) Foreign Application Priority Data
Aug. 16, 2019 (CN) .......................... 201910760749.9

(51) Int. Cl.
*H04W 48/18* (2009.01)
*H04L 5/00* (2006.01)
*H04L 61/4511* (2022.01)

(52) U.S. Cl.
CPC ........... *H04W 48/18* (2013.01); *H04L 5/0053* (2013.01); *H04L 61/4511* (2022.05)

(58) Field of Classification Search
None
See application file for complete search history.

(56) References Cited

U.S. PATENT DOCUMENTS

| | | | |
|---|---|---|---|
| 12,075,496 B2 * | 8/2024 | Long | ..................... H04W 48/16 |
| 2019/0254083 A1 * | 8/2019 | Stammers | ............... H04W 8/02 |

(Continued)

FOREIGN PATENT DOCUMENTS

| | | |
|---|---|---|
| CN | 107347205 A | 11/2017 |
| CN | 108632308 A | 10/2018 |

(Continued)

OTHER PUBLICATIONS

3GPP, "3rd Generation Partnership Project; Technical Specification Group Services and System Aspects; System Architecture for the 5G System; Stage 2 (Release 16)" 3GPP TS 23.501 V16.2.0, Jul. 11, 2019, 393 pages.

(Continued)

*Primary Examiner* — Nicholas Sloms
(74) *Attorney, Agent, or Firm* — CANTOR COLBURN LLP

(57) ABSTRACT

Provided are a method and apparatus for reporting user plane function (UPF) information, a storage medium, and an electronic apparatus. The method includes: in a case where a UPF is deployed on a base station side, receiving, by a core network device, a first message sent by a radio access network (RAN) device, wherein the first message carries UPF information.

16 Claims, 7 Drawing Sheets

(56) References Cited

U.S. PATENT DOCUMENTS

| | | | |
|---|---|---|---|
| 2019/0356743 A1* | 11/2019 | Park | H04W 4/70 |
| 2019/0380128 A1* | 12/2019 | Park | H04W 88/10 |
| 2020/0195521 A1* | 6/2020 | Bogineni | H04W 36/26 |
| 2021/0084713 A1* | 3/2021 | Miklos et al. | H04W 76/12 |
| 2021/0168584 A1* | 6/2021 | Li | H04W 8/065 |
| 2022/0232369 A1* | 7/2022 | Puente Pestana et al. | H04L 67/14 |
| 2022/0330071 A1* | 10/2022 | Li | H04W 24/10 |

FOREIGN PATENT DOCUMENTS

| | | |
|---|---|---|
| CN | 108882334 A | 11/2018 |
| CN | 109429364 A | 3/2019 |
| CN | 109756346 A | 5/2019 |
| CN | 109996346 A | 7/2019 |
| KR | 20190004217 A | 1/2019 |
| WO | 2018172182 A1 | 9/2018 |
| WO | 2018176482 A1 | 10/2018 |
| WO | 2018224126 A1 | 12/2018 |
| WO | 2018233445 A1 | 12/2018 |
| WO | 2019037779 A1 | 2/2019 |

OTHER PUBLICATIONS

3GPP, "Charging support with IAB" Release 16, 3GPP TS 23.501 V16. 12.0 (2019-076), 34 pages.

European Search Report for Application No. 20854720.8, dated Sep. 29, 2022, 11 pages.

Nokia, "Architecture and Protocols: Connectivity Service Solution for IAB", 3GPP TSG-RAN WG2 NR Adhoc 1801 Vancouver, Canada, Jan. 22-26, 2018, R2-1800393.

Nokia, "Selection of user plane functional entity deployed at the edge local network", SA WG2 Meeting #114 Apr. 11-15, 2016, Sophia Antipolis, France, S2-161554, 3 pages.

International Search Report for corresponding application PCT/CN2020/085661 filed Apr. 20, 2020; Mail date May 28, 2020.

Nokia, "Mobility for vertical LAN (deterministic) services (e.g. TSN)", SA WG2 Meeting #128-Bis Aug. 20-24, 2018, Sophia Antipolis, S2-188102.

* cited by examiner

In a case where a UPF entity is deployed on a base station side, a core network device receives a first message sent by an RAN device, wherein the first message carries UPF entity information — S202

METHOD AND APPARATUS FOR REPORTING USER PLANE FUNCTION INFORMATION, STORAGE MEDIUM, AND ELECTRONIC APPARATUS

CROSS-REFERENCE TO RELATED APPLICATION

This application is a National Stage Filing of PCT International Application No. PCT/CN2020/085661 filed on Apr. 20, 2020, which claims priority to China Patent Application No. 201910760749.9, filed on Aug. 16, 2019 in China National Intellectual Property Administration, which is hereby incorporated by reference in its entirety.

TECHNICAL FIELD

The present application relates to the field of communications, in particular, to a method and apparatus for reporting user plane function (UPF) information, a storage medium, and an electronic apparatus.

BACKGROUND

In the related art, in a 5th Generation (5G) mobile communication system, a 5G base station is called a new generation radio access network node (NG RAN Node, short as gNB), and at the same time, a 5G core network is also added with many function entities, such as an access and mobility management function (AMF), a session management function (SMF), a UPF, an authentication server function (AUSF), and a service communication proxy (SCP). A base station side can be connected to a core network through different interfaces. Specific interface deployment is as shown in FIG. 1, including packet control function (PCF), unified data management (UDM), network element functions (NEF), network slice selection function (NSSF), application function (AF), user equipment (UE), etc., which are connected to a data network (DN) through interfaces. The SMF is responsible for the selection and reselection of the UPF. The SMF can discover UPF entities through a network repository function (NRF).

However, in the future evolution of 5G, the deployment of UPF will be more flexible. For example, the UPF may be deployed on a radio access network (RAN) side, and UPF information needs to be reported to the core network from the RAN side and then transmitted to the SMF. However, in a standard protocol, a method for reporting the UPF information on the RAN side has not been clearly defined.

SUMMARY

The present application provides a method and apparatus for reporting UPF information, a storage medium, and an electronic apparatus, which can at least solve the problem in the related art that there is no method for reporting UPF information on an RAN side of a new system.

According to one embodiment of the present application, a method for reporting UPF information is provided, including: in a case where a UPF is deployed on a base station side, receiving, by a core network device, a first message sent by an RAN device, wherein the first message carries UPF information.

According to one embodiment of the present application, a method for reporting UPF information is provided, including: in a case where a UPF is deployed on a base station side, sending, by an RAN, a first message to a core network device, wherein the first message carries UPF information.

According to one embodiment of the present application, an apparatus for reporting UPF information is provided, including: a receiving module configured to, in a case where a UPF is deployed on a base station side, receive a first message sent by an RAN device, wherein the first message carries UPF information.

According to one embodiment of the present application, an apparatus for reporting UPF information is provided. The apparatus is applied to an RAN device and includes a sending module configured to, in a case where a UPF is deployed on a base station side, send a first message to a core network device, wherein the first message carries UPF information.

According to another embodiment of the present application, a storage medium is further provided. The storage medium stores a computer program. The computer program is configured to, when being executed, implement any method embodiment of the present application According to another embodiment of the present application, an electronic apparatus is further provided, including a memory and a processor. The memory stores a computer program. The processor is configured to, when executing the computer program, implement any method embodiment of the present application.

By means of the present application, since the core network device receives the first message sent by the RAN device in a case where a UPF is deployed on the base station side, wherein the first message carries the UPF information, the problem in the related art that there is no method for reporting UPF information on an RAN side of a new system can be solved, and the technical effect of reporting the UPF information at the RAN side is achieved.

DETAILED DESCRIPTION

The present application will be described below with reference to the accompanying drawings and in combination with embodiments.

The terms "first", "second", etc. in the description and claims of the present application and the above-mentioned drawings are used to distinguish similar objects, and are not necessarily used to describe a specific sequence or a precedence order.

Embodiment I

A mobile communication network (including but not limited to a 5G mobile communication network) is provided in the embodiment of the present application. The network architecture of the network may include a network side device (such as a base station) and a terminal. A method for reporting UPF information, which can be operated on the above-mentioned network architecture, is provided in this embodiment. An operation environment of the above-mentioned information transmission method provided in the embodiment of the present application is not limited to the above-mentioned network architecture.

Figures 1, 2:
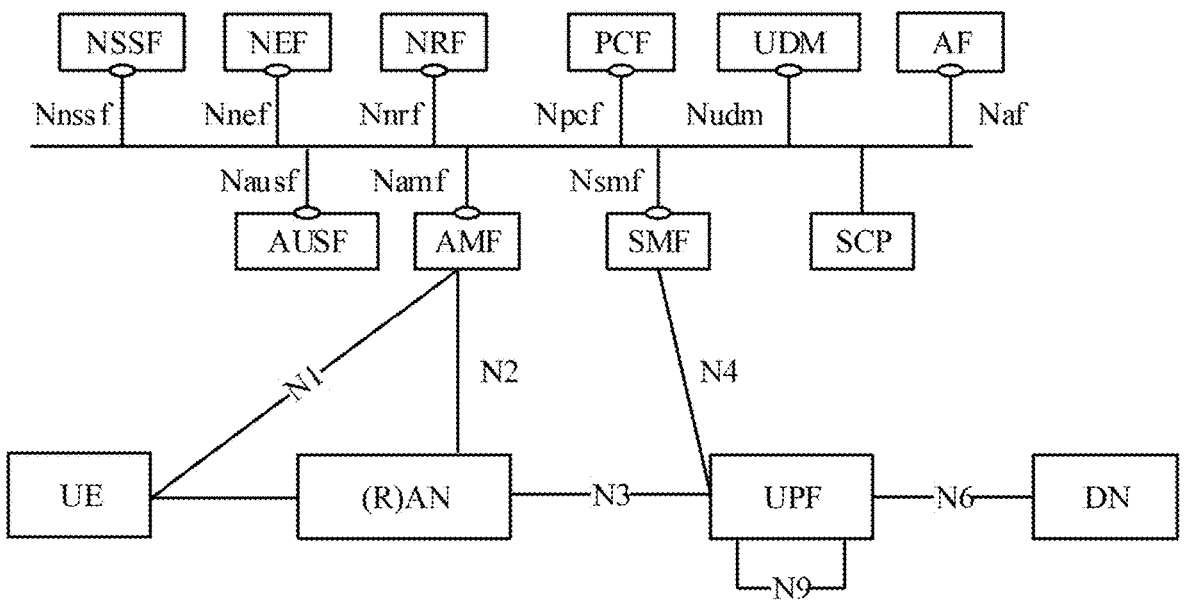
FIG. 1 is a schematic diagram of one interface deployment provided according to an embodiment of the present application.
FIG. 2 is a flowchart of a method for reporting UPF information provided according to an embodiment of the present application.

A method for reporting UPF information is provided in this embodiment. FIG. 2 is a flowchart of a method for reporting UPF information provided according to an embodiment of the present application. As shown in FIG. 2, the flow includes the following operation.

At operation S202, in a case where a UPF is deployed on a base station side, a core network device receives a first message sent by an RAN device, wherein the first message carries UPF information.

By the above operations, the problem in the related art that there is no method for reporting UPF information applied to an RAN side of a new system is solved, and the technical effect of reporting the UPF information at the RAN side.

As an exemplary implementation, the core network device includes an access and mobility management function (AMF).

As an exemplary implementation, the UPF information includes at least one of: a data network name (DNN), single network slice selection assistance information (S-NSSAI), an Internet protocol (IP) address, a fully qualified domain name (FQDN), an SMF area identifier, and base station information associated with the UPF.

As an exemplary implementation, the first message includes at least one of: a protocol data unit (PDU) session modify indication message, a path switch request message, and an RAN configuration update message.

As an exemplary implementation, after the core network device receives the first message sent by the RAN device, the method further includes: in a case where the core network device is an AMF, the AMF sends the UPF information to an SMF through a third message.

As an exemplary implementation, the third message includes at least one of: a PDU session mobility management context create request message, and a PDU session mobility management context status subscribe message.

As an exemplary implementation, after the core network device receives the first message sent by the RAN device, the AMF performs one of the following operations: the AMF directly sends the UPF information to the SMF; or the AMF stores the UPF information in the AMF, performs preset processing on the UPF information, and sends the UPF information to the SMF.

As an exemplary implementation, the operation that the AMF stores the UPF information in the AMF, performs preset processing on the UPF information and sends the UPF information to the SMF includes one of the following operations: the AMF sends all UPF information reported by the RAN device to the SMF; or, the AMF screens the received UPF information and sends, to the SMF, a part of UPF information obtained by the screening.

As an exemplary implementation, the operation that the AMF screens the received UPF information includes the following operations: first network slice information stored in the AMF and carried by a user equipment (UE) in a case where a PDU session is created is acquired; and UPF information carrying network slice information that is the same as the first network slice information is screened out and used as the part of UPF information.

As an exemplary implementation, the operation that the AMF stores the UPF information in the AMF, performs preset processing on the UPF information and sends the UPF information to the SMF includes one of the following: the AMF sends the UPF information to all SMFs; or, the AMF sends the UPF information to an SMF that matches the UPF information.

As an exemplary implementation, the operation that the AMF sends the UPF information to an SMF that matches the UPF information includes the following operations: one of following first information of all SMFs is acquired: a DNN or S-NSSAI; and the SMF that matches the UPF information is selected according to a matching degree between second information included in the UPF information and the first information, wherein the second information is a DNN or S-NSSAI carried in the UPF information.

In this embodiment, another method for reporting UPF information is provided. The method includes the following operation.

At operation I, in a case where a UPF is deployed on a base station side, an RAN device sends a first message to a core network device, wherein the first message carries UPF information.

As an exemplary implementation, before the RAN device sends the first message to the core network device, the method further includes: in a case where the UPF is deployed on a base station side distributed unit (gNB-DU), the gNB-DU sends the UPF information to a base station side central unit (gNB-CU) through a second message; or, in a case where the UPF is deployed on a base station side central unit-user plane (gNB-CU-UP), the gNB-CU-UP sends the UPF information to a base station side central unit-control plane (gNB-CU-CP) through a second message.

As an exemplary implementation, the second message includes at least one of: a gNB-DU configuration update message, a UE context modification request message, a gNB-CU-UP configuration update message, and a bearer context modification request message.

The following description is made with reference to examples of the embodiments of the present application.

Figure 3:
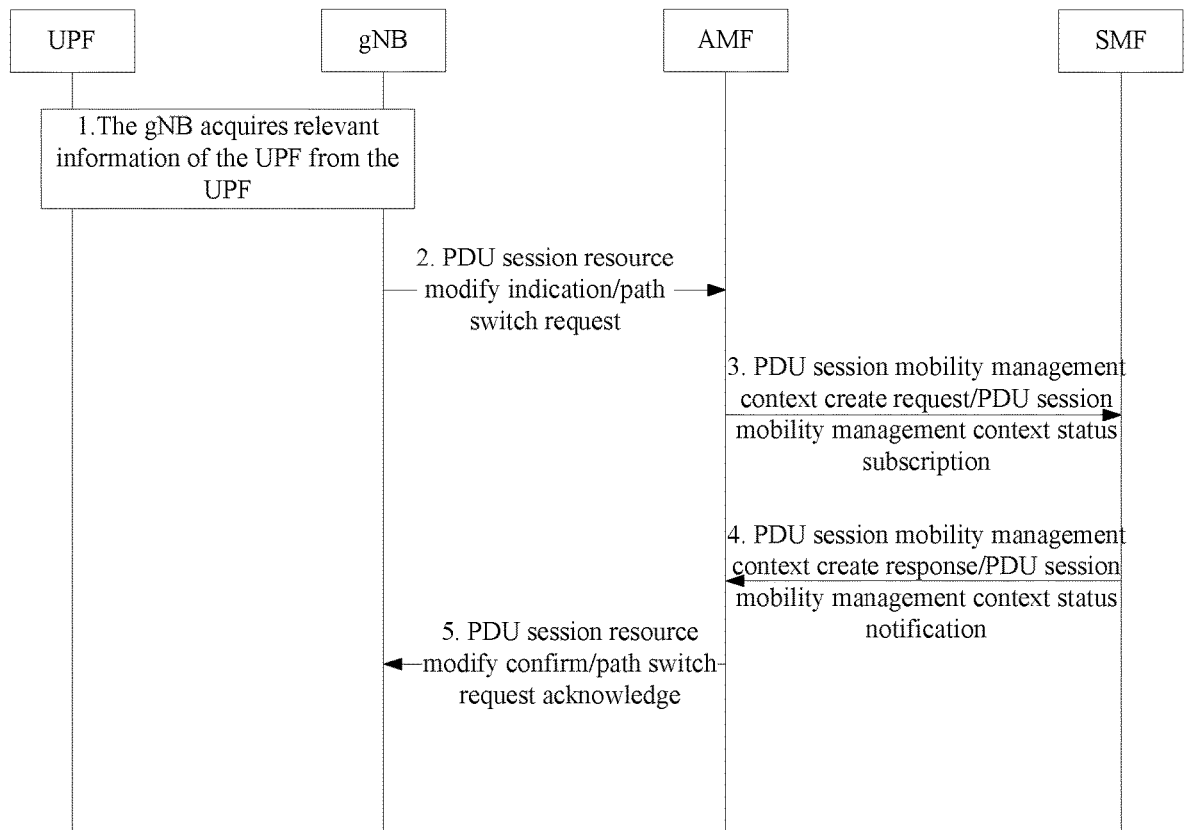
FIG. 3 is a schematic diagram of a method for reporting UPF information from an RAN side to a core network side provided according to an embodiment of the present application.

In Example 1, the UPF information is reported from the RAN side to the core network side (AMF transparent transmission). As shown in FIG. 3, the process includes the following operations.

At operation 1: in a case where a UPF is deployed on the base station side, a gNB acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell identifier (cell ID) or a next generation radio access network node identifier (NG-RAN node ID).

At operation 2: the gNB sends the acquired UPF information to the AMF through an NG interface message. The NG interface message may be a PDU session resource modify indication message or a path switch request message.

At operation 3: after the AMF receives the UPF information, the AMF directly sends the UPF information to the SMF without further processing. The interface message may include a PDU session mobility management context create request message (Nsmf_PDUSession_CreateSMContextRequest), and a PDU session mobility management context status subscribe message (Nsmf_PDUSession_SMContextStatusSubscribe).

At operation 4: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 5: the AMF sends a PDU session resource modify confirm message or a path switch request acknowledge message to the gNB.

Figure 4:
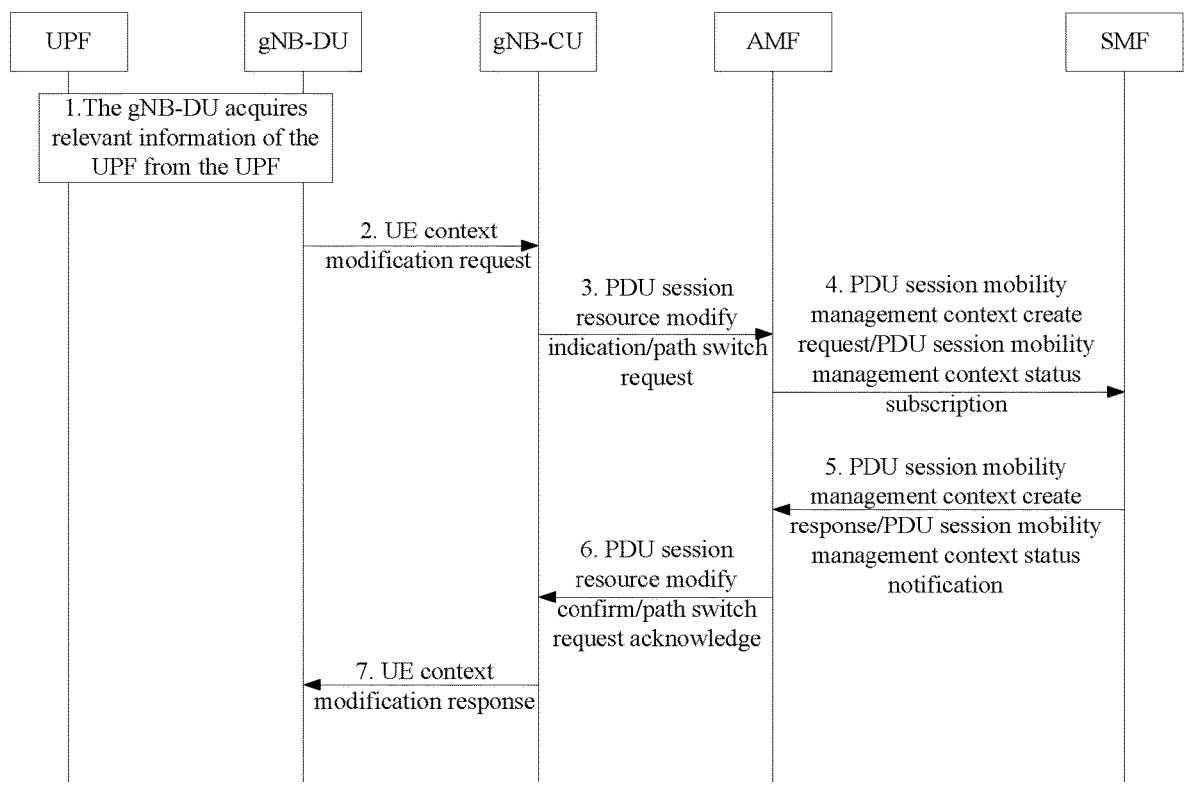
FIG. 4 is a schematic diagram of a method for reporting UPF information from an RAN side to a core network side under a central unit-distributed unit (CU-DU) distribution architecture provided according to an embodiment of the present application.

In Example 2, under a CU-DU distribution architecture, the UPF information is reported from the RAN side to the core network side (AMF transparent transmission). As shown in FIG. 4, the process includes the following operations.

At operation 1: in a case where a UPF is deployed in a gNB-DU, the gNB-DU acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell ID or an NG-RAN node ID.

At operation 2: the gNB-DU sends the acquired UPF information to a gNB-CU through a UE context modification request message via an F1 interface.

At operation 3: the gNB-CU sends the acquired UPF information to the AMF through an NG interface message. The NG interface message may be a PDU session resource modify indication message or a path switch request message.

At operation 4: after the AMF receives the UPF information, the AMF directly sends the UPF information to the SMF without further processing. The interface message may include a PDU session mobility management context create request message (Nsmf_PDUSession_CreateSMContextRequest), and a PDU session mobility management context status subscribe message (Nsmf_PDUSession_SMContextStatusSubscribe).

At operation 5: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 6: the AMF sends a session resource modify confirm message or a path switch request acknowledge message to the gNB-CU.

At operation 7: the gNB-CU sends a UE context modification response message to the gNB-DU.

Figure 5:
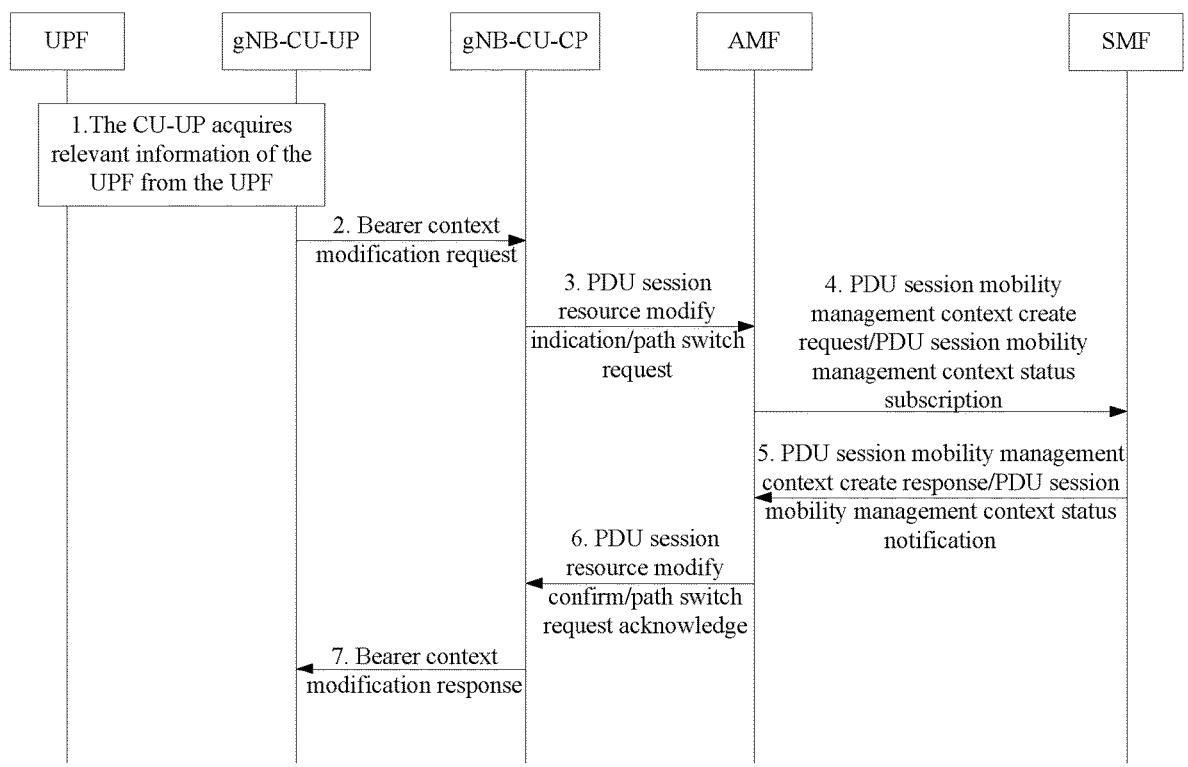
FIG. 5 is a schematic diagram of a method for reporting UPF information from an RAN side to a core network side under a control plane-user plane (CP-UP) distribution architecture provided according to an embodiment of the present application.

In Example 3, under a CP-UP distribution architecture, the UPF information is reported from the RAN side to the core network side (AMF transparent transmission). As shown in FIG. 5, the process includes the following operations.

At operation 1: in a case where a UPF is deployed at a gNB-CU-UP, a gNB-CU-CP acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell ID or an NG-RAN node ID.

At operation 2: the gNB-DU sends the acquired UPF information to the gNB-CU-CP through a bearer context modification request message via an E1 interface.

At operation 3: the gNB-CU-CP sends the acquired UPF information to the AMF through an NG interface message. The NG interface message may be a PDU session resource modify indication message or a path switch request message.

At operation 4: after the AMF receives the UPF information, the AMF directly sends the UPF information to the SMF without further processing. The interface message may include a PDU session mobility management context create request message (Nsmf_PDUSession_CreateSMContextRequest), and a PDU session mobility management context status subscribe message (Nsmf_PDUSession_SMContextStatusSubscribe).

At operation 5: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 6: the AMF sends a session resource modify confirm message or a path switch request acknowledge message to the gNB-CU-CP.

At operation 7: the gNB-CU-CP sends a bearer context modification response message to the gNB-CU-UP.

Figure 6:
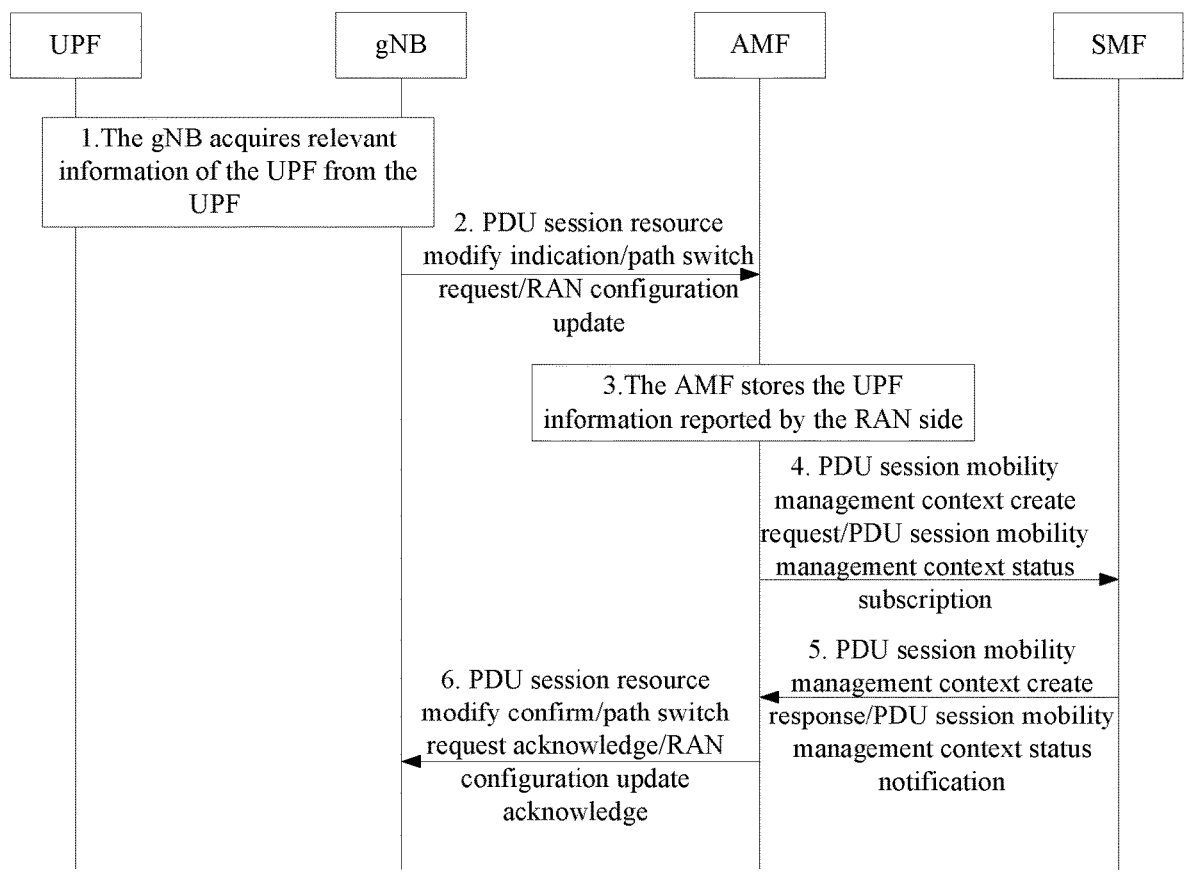
FIG. 6 is a schematic diagram of another method for reporting UPF information from an RAN side to a core network side provided according to an embodiment of the present application.

In Example 4, the UPF information is reported from the RAN side to the core network side (AMF stores the UPF). As shown in FIG. 6, the process includes the following operations.

At operation 1: in a case where a UPF is deployed on the base station side, a gNB acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell ID or an NG-RAN node ID.

At operation 2: the gNB sends the acquired UPF information to the AMF through an NG interface message. The NG interface message may be a PDU session resource modify indication message, or a path switch request message, or an RAN configuration update message.

At operation 3: after receiving the UPF information, the AMF stores the UPF information on the AMF side. For the stored UPF information, the AMF has two processing solutions. In Solution I, the AMF sends all UPF information reported by the RAN side to the SMF. In Solution II, the AMF screens out part of the UPF information according to a service characteristic of a current UE and sends appropriate UPF information to the SMF. The service characteristic of the UE may include slice information carried by the UE in a case where a PDU session is created.

At operation 4: the AMF sends the UPF information to the SMF through interface information. The interface message may include a PDU session mobility management context create request message (Nsmf_PDUSession_CreateSMContextRequest), and a PDU session mobility management context status subscribe message (Nsmf_PDUSession_SMContextStatusSubscribe). In addition, there are two solutions for the AMF to send the UPF information to the SMF. In Solution I, the AMF may directly send the acquired UPF information to all SMFs. In Solution II, the AMF may send the acquired UPF information to the SMF that matches the UPF information. For Solution II, a main basis for determining matching is whether the DNN and S-NSSAI in the UPF information match the DNN and S-NSSAI of the SMF.

At operation 5: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 6: the AMF sends a PDU session resource modify confirm message, or a path switch request acknowledge message, or an RAN configuration update acknowledge information to the gNB.

Figure 7:
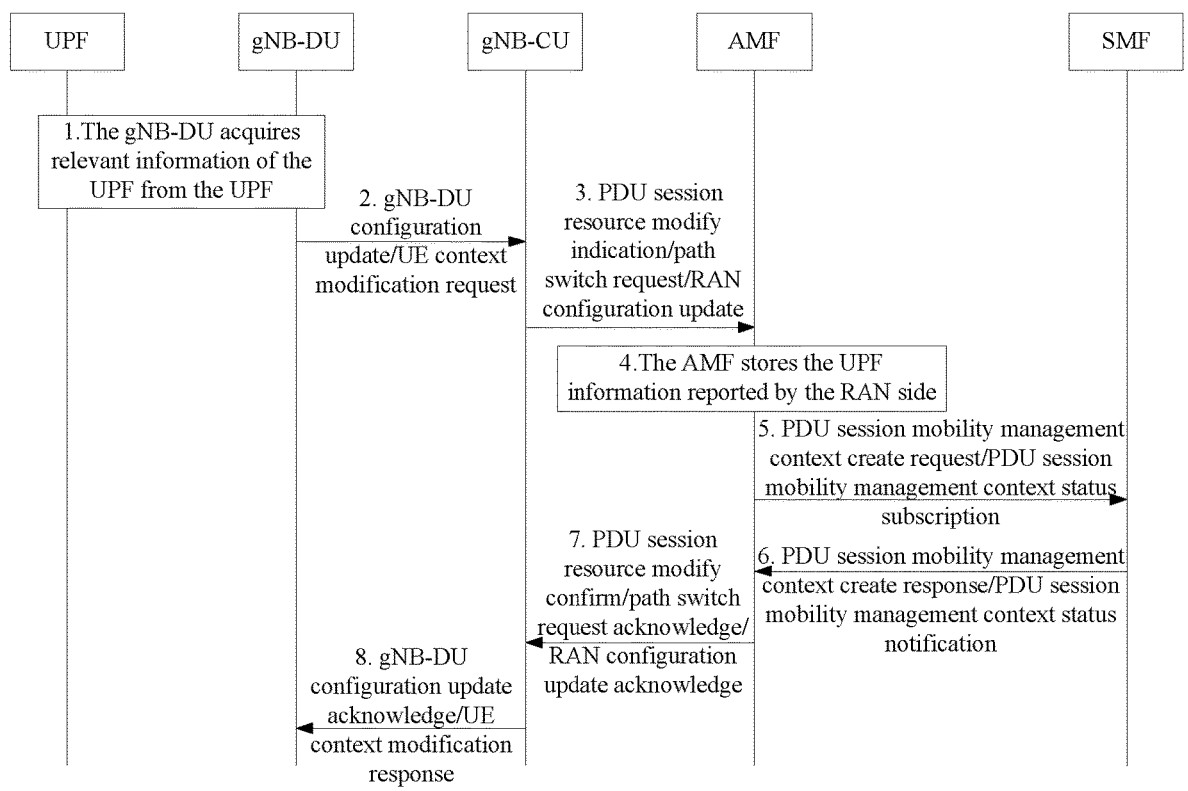
FIG. 7 is a schematic diagram of a method for reporting UPF information from an RAN side to a core network side under another CU-DU distribution architecture provided according to an embodiment of the present application.

In Example 5, under a CU-DU distribution architecture, the UPF information is reported from the RAN side to the core network side (AMF stores the UPF information). As shown in FIG. 7, the process includes the following operations.

At operation 1: in a case where a UPF is deployed in a gNB-DU, the gNB-DU acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell ID or an NG-RAN node ID.

At operation 2: the gNB-DU sends the acquired UPF information to the gNB-CU through an F1 interface message. The F1 interface message may be a UE context modification request message or a gNB-DU configuration update message.

At operation 3: the gNB-CU sends the acquired UPF information to the AMF through an NG interface message. The NG interface message may be a PDU session resource modify indication message, or a path switch request message, or an RAN configuration update message.

At operation 4: after receiving the UPF information, the AMF stores the UPF information on the AMF side. For the stored UPF information, the AMF has two processing solutions. In Solution I, the AMF sends all UPF information reported by the RAN side to the SMF. In Solution II, the AMF screens out part of the UPF information according to a service characteristic of a current UE and sends appropriate UPF information to the SMF. The service characteristic of the UE may include slice information carried by the UE in a case where a PDU session is created.

At operation 5: the AMF sends the UPF information to the SMF through an interface message. The interface message may include a PDU session mobility management context create request message (Nsmf_PDUSession_CreateSMContextRequest), and a PDU session mobility management context status subscribe message (Nsmf_PDUSession_SMContextStatusSubscribe). In addition, there are two solutions for the AMF to send the UPF information to the SMF. In Solution I, the AMF may directly send the acquired UPF information to all SMFs. In Solution II, the AMF may send the acquired UPF information to the SMF that matches the UPF information. For Solution II, a main basis for determining matching is whether the DNN and S-NSSAI in the UPF information match the DNN and S-NSSAI of the SMF.

At operation 6: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 7: the AMF sends a session resource modify confirm message, or a path switch request acknowledge message, or an RAN configuration update acknowledge information to the gNB-CU At operation 8: the gNB-CU sends a UE context modification response message or a gNB-DU configuration update acknowledge message to the gNB-DU.

Figure 8:
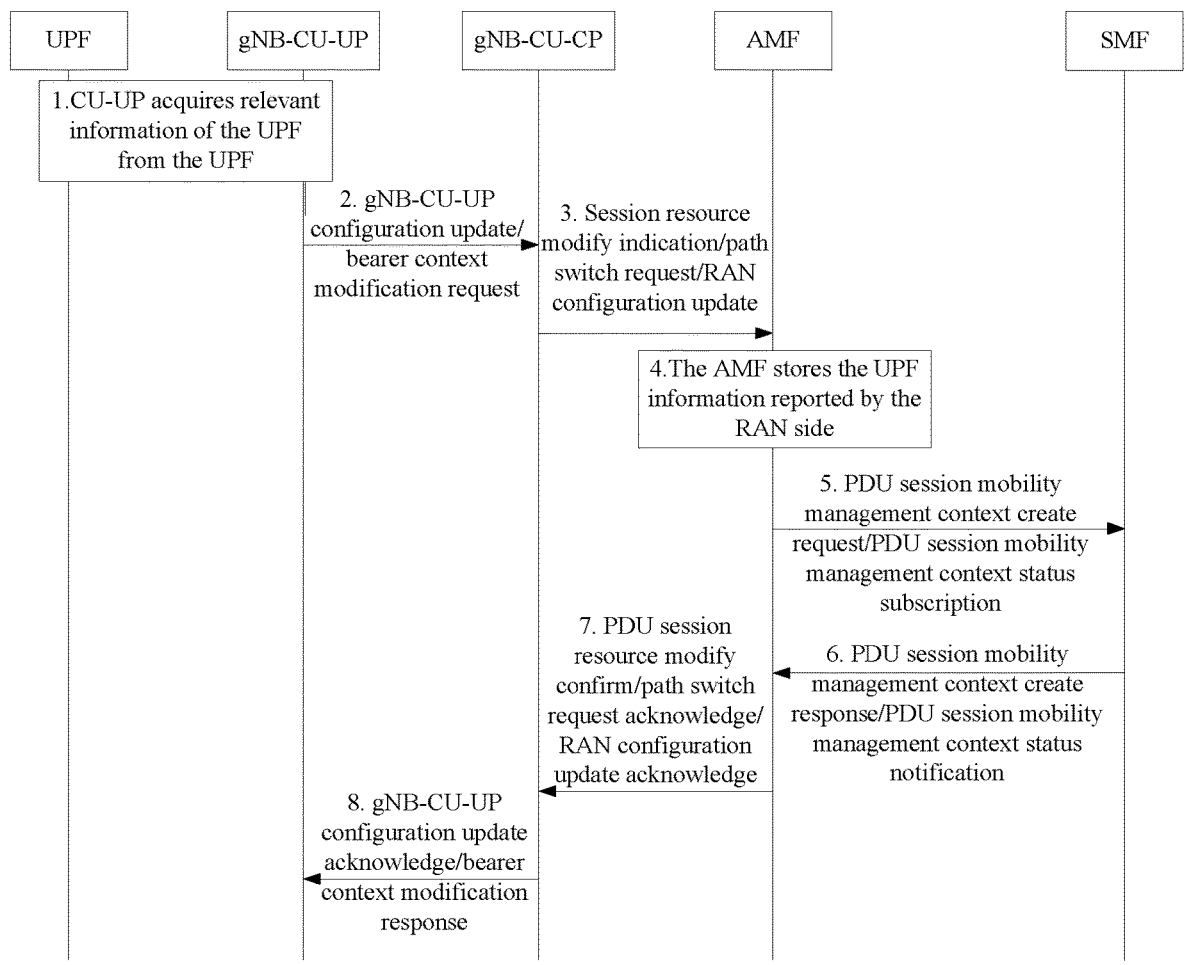
FIG. 8 is a schematic diagram of a method for reporting UPF information from an RAN side to a core network side under another CP-UP distribution architecture provided according to an embodiment of the present application.

In Example 6, under a CP-UP distribution architecture, the UPF information is reported from the RAN side to the core network side (AMF stores the UPF information). As shown in FIG. 8, the process includes the following operations.

At operation 1: in a case where a UPF is deployed at a gNB-CU-UP, a gNB-CU-UP acquires relevant information of the UPF (UPF information) from a UPF, wherein the UPF information includes a DNN, an S-NSSAI, an IP address, an FQDN, an SMF area identifier, base station information associated with the UPF, etc. The base station information associated with the UPF may be a cell ID or an NG-RAN node ID.

At operation 2: the gNB-CU-UP sends the acquired UPF information to the gNB-CU-CP through an E1 interface message. The E1 interface message may be a bearer context modification request message or a gNB-CU-UP configuration update message.

At operation 3: the gNB-CU-CP sends the acquired UPF information to the AMF through an NG interface message. The NG interface message may be a PDU session resource modify indication message, or a path switch request message, or an RAN configuration update message.

At operation 4: after receiving the UPF information, the AMF stores the UPF information on the AMF side. For the stored UPF information, the AMF has two processing solutions. In Solution I, the AMF sends all UPF information reported by the RAN side to the SMF. In Solution II, the AMF screens out part of the UPF information according to a service characteristic of a current UE and sends appropriate UPF information to the SMF. The service characteristic of the UE may include slice information carried by the UE in a case where a PDU session is created.

At operation 5: the AMF sends the UPF information to the SMF through an interface message. The interface message may include a PDU session mobility management context create request message (Nsmf_PDUSession_CreateSMContextRequest), and a PDU session mobility management context status subscribe message (Nsmf_PDUSession_SMContextStatusSubscribe). In addition, there are two solutions for the AMF to send the UPF information to the SMF. In Solution I, the AMF may directly send the acquired UPF information to all SMFs. In Solution II, the AMF may send the acquired UPF information to the SMF that matches the UPF information. For Solution II, a main basis for determining matching is whether the DNN and S-NSSAI in the UPF information match the DNN and S-NSSAI of the SMF.

At operation 6: after receiving the relevant information of the UPF (UPF information), the SMF sends a PDU session mobility management context create response message (Nsmf_PDUSession_CreateSMContextResponse) or a PDU session mobility management context status notify message (Nsmf_PDUSession_SMContextStatusNotify) to the AMF.

At operation 7: the AMF sends a session resource modify confirm message, or a path switch request acknowledge message, or an RAN configuration update acknowledge information to the gNB-CU.

At operation 8: the gNB-CU-CP sends a bearer context modification response message or a gNB-CU-UP configuration update acknowledge message to the gNB-CU-UP.

Through the descriptions of the above implementation modes, the method of the above embodiment can be implemented by means of software and a necessary general hardware platform, and of course, can also be implemented by hardware. The technical solution of the present application can be embodied in the form of a software product, and a computer software product is stored in one storage medium (such as a read-only memory (ROM)/an RANdom access memory (RAM), a magnetic disk, and an optical disk) and includes several instructions for enabling a terminal device (which can be a mobile phone, a computer, a server, or a network device, etc.) to execute the methods described in the various embodiments of the present application.

Embodiment II

In this embodiment, an apparatus for reporting UPF information is further provided. The apparatus is used for implementing the above embodiment and implementation modes. Those described will not be repeatedly described. As used below, the term "module" can implement a combination of software and/or hardware with predetermined functions. Although the apparatus described in the following embodiments is implemented by software, implementation by hardware or a combination of software and hardware is also possible and conceived.

According to another embodiment of the present application, a structural block diagram of an apparatus for reporting UPF information is further provided. The apparatus includes:

a receiving module configured to, in a case where a UPF is deployed on a base station side, receive a first message sent by an RAN device, wherein the first message carries UPF information.

According to another embodiment of the present application, a structural block diagram of an apparatus for reporting UPF information is further provided. The apparatus includes:

a sending module configured to, in a case where a UPF is deployed on a base station side, send a first message to a core network device, wherein the first message carries UPF information.

All the above modules can be implemented by software or hardware. For the latter, they can be implemented by the following methods, but are not limited to this. The above-mentioned modules are all located in a same processor, or all the above-mentioned modules are respectively located in different processors in any combination form.

Embodiment III

An embodiment of the present application further provides a storage medium. As an exemplary implementation of this embodiment, the above-mentioned storage medium may be configured to store a program code used for executing the following operation:

S1, in a case where a UPF is deployed on a base station side, a core network device receives a first message sent by an RAN device, wherein the first message carries UPF information.

As an exemplary implementation of this embodiment, the foregoing storage medium includes, but is not limited to: various media capable of storing program codes, such as a universal serial bus (USB) flash disk (U disk), a ROM, a RAM, a mobile hard disk, a magnetic disk or an optical disk.

An embodiment of the present application further provides an electronic apparatus, including a memory and a processor. The memory stores a computer program. The processor is configured to execute the computer program to execute the operations in any one of the above-mentioned method embodiments.

As an exemplary implementation, the above-mentioned electronic apparatus may further include a transmission apparatus and an input/output device. The transmission apparatus is connected to the above-mentioned processor, and the input/output device is connected to the above-mentioned processor.

As an exemplary implementation of this embodiment, the processor may be configured to execute the following operation through the computer program:

S1, in a case where a UPF is deployed on a base station side, a core network device receives a first message sent by an RAN device, wherein the first message carries UPF information.

For specific examples in this embodiment, reference may be made to the examples described in the foregoing embodiments and optional implementation modes, and details are not described herein again in this embodiment.

The above-mentioned modules or operations of the present application can all be implemented by a general-purpose computing apparatus, and they can be integrated on a single computing apparatus, or distributed on a network composed of multiple computing apparatuses. As an exemplary implementation, they can be implemented using computing-apparatus-executable program codes such that they can be stored in a storage apparatus and executed by computing apparatuses. In some cases, the operations shown or described can be performed in an order different from that herein, or they are separately fabricated into individual integrated circuit modules, or multiple modules or operations in them are fabricated into single integrated circuit modules. Therefore, the present disclosure is not limited to any particular hardware and software combinations.

What is claimed is:

1. A method for reporting user plane function (UPF) information, comprising:

in a case where a UPF is deployed on a base station side, receiving, by an Access and Mobility Management Function (AMF), a first message sent by a radio access network (RAN) device, wherein the first message carries UPF information;

storing, by the AMF, the UPF information in the AMF, performing, by the AMF preset processing on the UPF information, and sending, by the AMF, the UPF information to a session management function (SMF);

wherein storing, by the AMF, the UPF information in the AMF, performing, by the AMF, preset processing on the UPF information, and sending, by the AMF, the UPF information to the SMF comprises: acquiring one of following first information of all SMFs: a data network name (DNN) or single network slice selection assistance information (S-NSSAI); and selecting the SMF that matches the UPF information according to a matching degree between second information comprised in the UPF information and the first information, wherein the second information is a DNN or S-NSSAI carried in the UPF information.

2. The method according to claim 1, wherein the UPF information comprises at least one of:
the DNN, the S-NSSAI, an Internet protocol (IP) address, fully qualified domain name (FQDN), a SMF area identifier, and base station information associated with the UPF.

3. The method according to claim 1, wherein the first message comprises at least one of:
a protocol data unit (PDU) session modify indication message, a path switch request message, and an RAN configuration update message.

4. The method according to claim 1, wherein after receiving, by an AMF, a first message sent by an RAN device, the method further comprises:
sending, by the AMF, the UPF information to an SMF through a third message.

5. The method according to claim 4, wherein the third message comprises at least one of:
a PDU session mobility management context create request message, and a PDU session mobility management context status subscribe message.

6. The method according to claim 1, wherein storing, by the AMF, the UPF information in the AMF, performing, by the AMF, preset processing on the UPF information, and sending, by the AMF, the UPF information to the SMF further comprises one of the following operations:
sending, by the AMF, all UPF information reported by the RAN device to the SMF; or
screening, by the AMF, the received UPF information, and sending, to the SMF by the AMF, a part of UPF information obtained by the screening.

7. The method according to claim 6, wherein screening, by the AMF, the received UPF information comprises:
acquiring first network slice information stored in the AMF and carried by a user equipment (UE) in a case where a PDU session is created; and
screening out UPF information carrying network slice information that is the same as the first network slice information as the part of UPF information.

8. A method for reporting user plane function (UPF) information, comprising:
in a case where a UPF is deployed on a base station side, sending, by a radio access network (RAN) device, a first message carrying UPF information to an Access and Mobility Management Function (AMF) to enable the AMF to store the UPF information in the AMF, perform preset processing on the UPF information, and send the UPF information to a Session Management Function (SMF), wherein storing, the UPF information in the AMF, performing, preset processing on the UPF information, and sending, the UPF information to the SMF comprises: acquiring one of following first information of all SMFs: a data network name (DNN) or single network slice selection assistance information (S-NSSAI); and selecting the SMF that matches the UPF information according to a matching degree between second information comprised in the UPF information and the first information, wherein the second information is a DNN or S-NSSAI carried in the UPF information.

9. The method according to claim 8, wherein before sending, by an RAN device, a first message to the AMF, the method further comprises:
in a case where the UPF is deployed on a base station side distributed unit (gNB-DU), sending, by the gNB-DU, the UPF information to a base station side central unit (gNB-CU) through a second message;
or, in a case where the UPF is deployed on a base station side central unit-user plane (gNB-CU-UP), sending, by the gNB-CU-UP, the UPF information to a base station side central unit-control plane (gNB-CU-CP) through a second message.

10. The method according to claim 9, wherein the second message comprises at least one of:
a gNB-DU configuration update message, a UE context modification request message, a gNB-CU-UP configuration update message, and a bearer context modification request message.

11. An apparatus for reporting user plane function (UPF) information, applied to an Access and Mobility Management Function (AMF), the apparatus comprising a memory storing instructions and a processor in communication with the memory, wherein the processor is configured to execute the instructions to implement the method for reporting UPF information according to claim 1.

12. An apparatus for reporting user plane function (UPF) information, applied to a radio access network (RAN) device, the apparatus comprising a memory storing instructions and a processor in communication with the memory, wherein the processor is configured to execute the instructions to implement the method for reporting UPF information according to claim 8.

13. A non-transitory storage medium which stores a computer program, wherein the computer program is configured to, when being executed, implement the method for reporting UPF information according to claim 1.

14. An electronic apparatus, comprising a memory and a processor, wherein the memory stores a computer program, and the processor is configured to execute the computer program to implement the method for reporting UPF information according to claim 1.

15. A non-transitory storage medium which stores a computer program, wherein the computer program is configured to, when being executed, implement the method for reporting UPF information according to claim 8.

16. The method according to claim 2, wherein the base station information associated with the UPF is a cell identifier (ID) or a next generation radio access network node identifier (NG-RAN node ID).

* * * * *